United States Patent [19]

Mahoney

[11] Patent Number: 4,818,007

[45] Date of Patent: Apr. 4, 1989

[54] VEHICLE SCREEN/SHADE

[76] Inventor: Robert Mahoney, 3288 Bermuda Rd., Lake Park, Fla. 33410

[21] Appl. No.: 58,824

[22] Filed: Jun. 5, 1987

[51] Int. Cl.$^4$ .............................................. B60P 3/05
[52] U.S. Cl. ................................. 296/24.1; 296/97.7; 296/97.8; 160/DIG. 3; 160/370.2
[58] Field of Search ...................... 296/24 R, 83, 97 R, 296/97 B, 97 F, 97 G, 97 J, 97 K, 138, 140, 141, 143, 145; 160/DIG. 2, DIG. 3, 327, 368 R, 368 S, 263; 280/749; 297/184

[56] References Cited

U.S. PATENT DOCUMENTS

| | | | |
|---|---|---|---|
| 3,062,381 | 11/1962 | Maiden | 160/263 X |
| 3,632,154 | 1/1972 | Woodrich | 296/24 R |
| 3,891,263 | 6/1975 | Orsulak | 296/24 R |
| 3,931,994 | 1/1976 | Palmiter | 296/24 R |
| 4,095,837 | 6/1978 | Hunter | 296/24 R |
| 4,118,066 | 10/1978 | Ricke | 297/184 |
| 4,202,577 | 5/1980 | Breitschwerdt et al. | 280/749 X |
| 4,560,245 | 12/1985 | Sarver | 296/97 D X |
| 4,659,144 | 4/1987 | Reese | 160/368 S X |
| 4,688,842 | 8/1987 | Arbenius | 296/24 R |

FOREIGN PATENT DOCUMENTS 2429216 1/1976 Fed. Rep. of Germany .... 296/97 E

Primary Examiner—Robert B. Reeves
Assistant Examiner—Russell D. Stormer
Attorney, Agent, or Firm—Malin, Haley & McHale

[57] ABSTRACT

A vehicle screen comprising a screen for providing an air flow barrier within the interior of a motor vehicle, the screen including a transparent portion and an opaque portion. The screen is mounted within the interior of the vehicle such that the transparent portion provides no substantial impediment to a driver's visibility. There includes a member for mounting the screen within the vehicle, and for retracting the screen about the mounting member. The screen is movable from a first retracted position to a second elongated position. The screen provides a dual function of compartmentalizing the vehicle such that only the driver's compartment would require air conditioning or heating, and secondly provides an opaque sun screen or shade which is placed about the vehicle's windows to prevent sun light from entering the vehicle, thereby cooling the vehicle and protecting the interior from the harmful effects of sunlight and heat.

6 Claims, 1 Drawing Sheet

VEHICLE SCREEN/SHADE

BACKGROUND OF THE INVENTION

The subject matter of the invention relates to vehicle screens, and more particularly to a vehicle screen providing the dual function of compartmentalizing the interior of a motor vehicle and providing a flexible sun screen.

The prior art is replete with devices which are meant to be utilized as window coverings or sun shields for automobiles. For example, U.S. Pat. No. 4,202,396 discloses a foldable sun shield for use in conjunction with motor vehicle windshields; U.S. Pat. No. 3,874,437 discloses a windshield cover designed to protect the windshield from the effects of snow, ice, or other foreign materials; and U.S. Pat. No. Des. 62,557 discloses automobile curtains.

However these devices are inadequate for providing an automobile screen which fulfills the function of an air flow barrier that truncates a portion of the vehicle and thereby reduces the necessity for air conditioning or heating, and simultaneously provides a flexible, movable sun screen when said device is not in use as an air flow barrier.

It is therefore highly desirable to provide a combination vehicle screen which is an air flow barrier and can compartmentalize the interior of a motor vehicle, and alternatively fulfill the function of an automobile window sun screen.

It is also highly desirable to provide a combination vehicle screen which contains transparent portions and opaque portions such that when in use as an air flow barrier, the device provides no substantial impediment to a driver's visibility.

It is also highly desirable to provide a combination vehicle screen which is cost effective yet operationally efficient.

It is also highly desirable to provide a combination vehicle screen which is movable from a first retracted position to a second elongated position.

It is also highly desirable to provide a combination vehicle screen which is longitudinally adjustable such that it can be readily incorporated into automobiles of varying length or width.

It is finally highly desirable to provide a combination vehicle screen which incorporates all of the above mentioned features and objects.

SUMMARY OF THE INVENTION

It is therefore an object of this invention to provide a combination vehicle screen which is an air flow barrier and can compartmentalize the interior of a motor vehicle, and alternatively fulfill the function of an automobile window sun screen.

It is also an object of this invention to provide a combination vehicle screen which contains transparent portions and opaque portions such that when in use as an air flow barrier, the device provides no substantial impediment to a driver's visibility.

It is also an object of this invention to provide a combination vehicle screen which is cost effective yet operationally efficient.

It is also an object of this invention to provide a combination vehicle screen which is movable from a first retracted position to a second elongated position.

It is also an object of this invention to provide a combination vehicle screen which is such that it can be readily incorporated into automobiles of varying length or width.

It is finally an object of this invention to provide a combination vehicle screen which incorporates all of the above mentioned features and objects.

Briefly, what is provided is a vehicle screen comprising screen means for providing an air flow barrier within the interior of a motor vehicle, the screen means including a transparent portion and an opaque portion. The screen means is mounted within the interior of the vehicle such that the transparent portion provides no substantial impediment to a driver's visibility. There includes a means for mounting the screen means within the vehicle, and means for retracting the screen means about the mounting means. The screen means is movable from a first retracted position to a second elongated position. The screen means provides a dual function of compartmentalizing the vehicle such that only the driver's compartment would require air conditioning or heating, and secondly provides an opaque sun screen which is placed about the vehicle's windows to prevent sun light from entering the vehicle, thereby cooling the vehicle and protecting the interior from the harmful effects of sunlight and heat.

BRIEF DESCRIPTION OF THE DRAWINGS

The above mentioned and other features and objects of this invention and the manner of obtaining them will become more apparent and the invention itself will be best understood by reference of the following description of an embodiment of the invention taken in conjuntion with the accompanying drawings, wherein.

DESCRIPTION OF THE SPECIFIC EMBODIMENT

Figure 1:
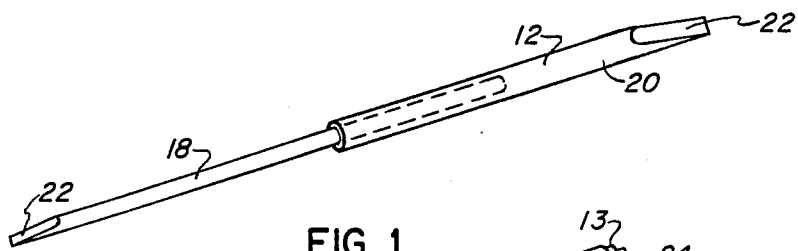
FIG. 1 is a perspective view illustrating an embodiment of the mounting means of the invention.
Figure 2:
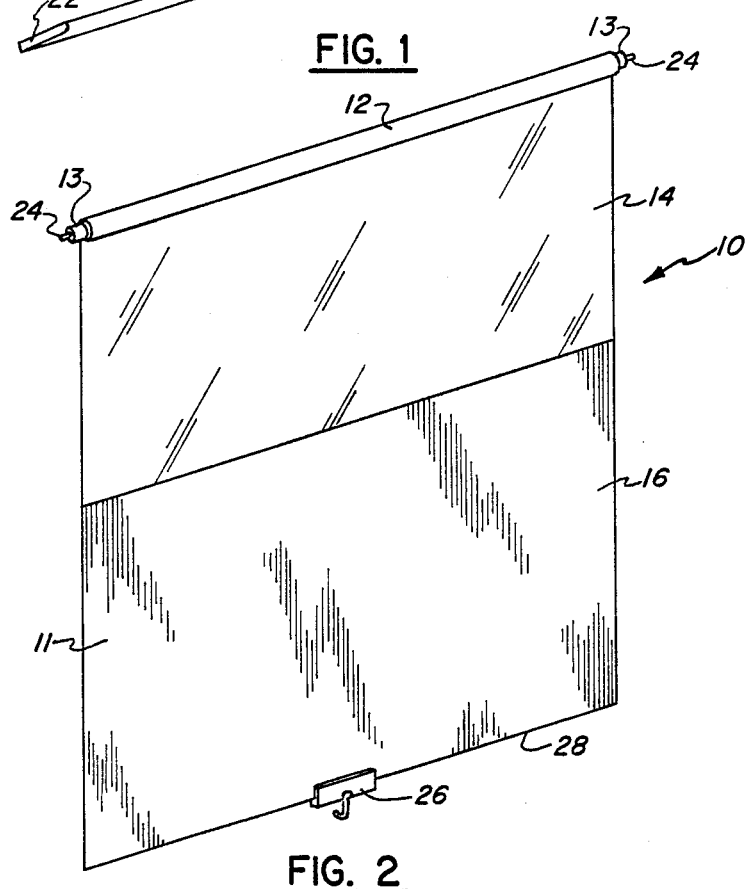
FIG. 2 is a perspective view of an embodiment of the invention illustrating the screen means, mounting means, and retracting means of the invention.

Referring now to FIGS. 1 and 2, the combination vehicle screen 10 is illustrated. The vehicle screen in general includes screen means 11, mounting means 12, and retracting means 13. Screen means 11 includes transparent portion 14 and opaque portion 16. When the screen means 10 is positioned in a generally transverse manner within the interior of the automobile such that it compartmentalizes the driver's section from the remainder of the vehicle, transparent portion 14 allows the driver to utilize the invention without substantial impediment to visibility through the rear window of the motor vehicle. As will be described in more detail hereinafter, when the invention is acting as an air flow barrier, the opaque portion 16 is positioned behind the driver's seat such that it does not obscure visibility.

When the invention is utilized as a sun shield, the opaque portion 16 acts as a shield as in the manner of a conventional window curtain or shade. It is important to note that once the invention is mounted within a motor vehicle, near the roof of said vehicle, there is not required any further repositioning of the invention. This will further be described hereinafter.

Mounting means 12 is shown as being adjustable through the discrete sections 18 and 20. In this embodiment, section 18 is adjustably positioned within section 20 in a conventional telescopic manner. In this alternative embodiment, wedged tips 22 provide the mounting means wherein the invention is positioned about the periphery of the interior roof of the automobile. Automobile manufacturers utilize molding, ridges, or other structural elements which provide the boundaries for the cloth or material roofs. The present mounting means is meant to adapt to the peripheries of the roofs as encountered. In reference to FIG. 1, the wedge tips 22 are meant to be utilized in conjunction with conventional automobile molding. That is the wedge tips would merely be placed into, or overlay, the external, molding boundaries of the roof.

FIG. 2 illustrates an embodiment of the invention using a retractable spring loaded rotating assembly as is conventionally utilized with household blinds. Pins 24 would interact with the boundaries of the automobiles interior roof to mount the invention.

In reference to FIG. 1, and alternative embodiments, the telescoping mounting rod is spring loaded. In alternative embodiments the mounting means could utilize end pieces which themselves are spring loaded as conventionally utilized in the curtain and blind industry.

Connecting means 26 allows the invention to be secured in place in its elongated position to the floor of an automobile or lower portion of the screen means when in use as an air flow barrier. In this embodiment the connecting means is merely a hook. It is to be readily understood that alternative connecting means exist including, inter alia, adhesives, hardware, tapes, and Velcro. It is also to be understood that the mounting means can be placed anywhere around the periphery of the screen means.

In construction, the screen means is any preferrably thin, transparent flexible material which can be attached to an opaque material to provide a generally continuous sheet. Any number of materials would satisfy the requirements of the invention, as is readily understood by those of ordinary skill in the art.

Figure 3:
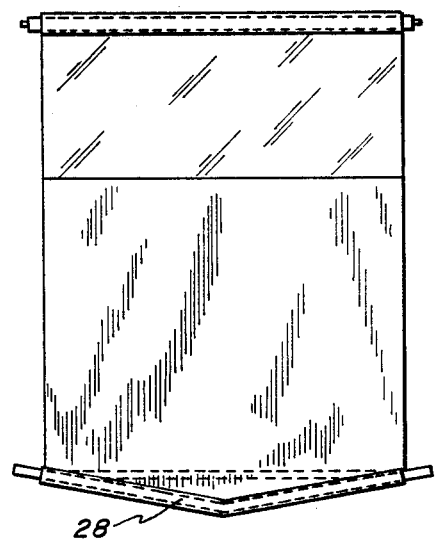
FIG. 3 is a front view of an alternative embodiment of the invention as illustrated in FIG. 2.

FIG. 3 illustrates the invention in its elongated position prior to being inserted within a motor vehicle. In this embodiment, the elongated edge has an alternative design which is meant to be incorporated and conform to the interior shape of the automobile. In this embodiment, elongated edge 28 is meant to conform to the general shape of the internal dashboard boundary of the windshield and be rigid or self supporting. This is done with the addition of a rigid member attached to 28.

Figure 4:
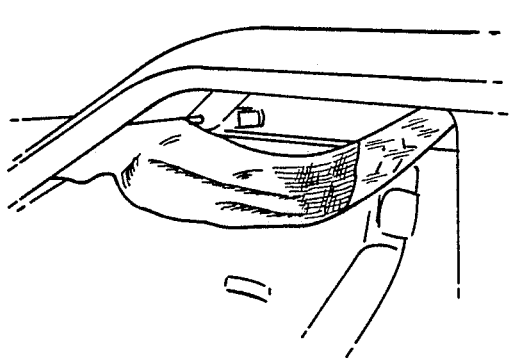
FIG. 4 is a perspective view illustrating the invention acting as a sun shield when the motor vehicle is in a parked position.

FIG. 4 illustrates the invention when placed within the automobile and acting as a sun shield. The invention is generally mounted near or about the roof of an automobile at position 30. The elongated edge is placed about the dashboard boundary of the windshield at position 32. In this embodiment the design and shape of the elongated edge 28 generally conforms to the shape of the windshield.

Figure 5:
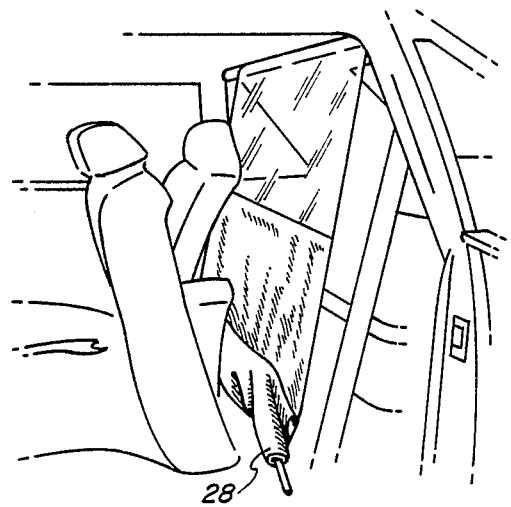
FIG. 5 is a perspective view illustrating the positioning of the invention within an automobile when the invention is being utilized as an air flow barrier which compartmentalizes the motor vehicle.

Referring now to FIG. 5, the invention is illustrated as fulfilling the function of an air flow barrier. It is significant to note that the mounting means is positioned in the same location 30 about or near the roof of the automobile. That is, when the mounting means 12 is in place within the automobile's interior it is not meant to be moved whether or not the invention is in use as an air flow barrier or as a sun shield. Depending on its use, only the elongated edge 28 is moved within the inner compartment of the vehicle. As illustrated in FIG. 5, when in use as an air flow barrier, the elongated edge 28 is generally positioned near or about the floor of the automobile behind the driver's seat. In this position it generally extends traversely throughout the car and compartmentalizes the driver's area 34 from the rear compartment 36 of the vehicle. It is to be understood that a plurality of the instant inventions could be utilized in a larger vehicle to thereby compartmentalize more than two sections of the vehicle.

In the embodiment illustrated in FIG. 5, no connecting means is required. The elongated edge 28 of the automobile is merely folded about itself such that it hangs or lays about the floor of the automobile. Note that the transparent portion 14 of the invention provides no substantial impediment to the driver's visibility through the rear window of the vehicle. When in place as an air flow barrier, the opaque portion 16 is behind the driver and front passenger seat such that it does not obscure visibility.

When positioned as illustrated in FIG. 5, the invention compartmentalizes the driver's area. Thus only a minimal amount of air conditioning or heating would be required to render comfortable the driver's section. It is unnecessary to climatize the unused portion of the vehicle. This is advantageous in that by restricting air flow to the driver's section, there is a direct reduction in air conditioning and heating. This reduction leads to a similar reduction of the fuel consumption of the automobile as less work is required by the engine, air conditioning, and/or heating units. This reduction in fuel consumption leads to both a direct economic savings, as well as long term benefits in terms of wear and maintenance of the automobile's engine, air conditioner, heater and other mechanical units.

FIGS. 4 and 5 illustrate the ease at which the invention can be alternatively utilized as a sun shield or as an air flow barrier. The driver must merely move the elongated edge 28 of the invention from one desired position to the other. This is easily accomplished in a manner of seconds.

The invention also has a utility in reference to the back window. That is, as opposed to placing the elongated edge 28 along the dashboard of the windshield, as illustrated in FIG. 4, the elongated edge could alternatively be moved in the reverse direction and be placed about the boundaries of the rear window and thereby provide a sun shield for the rear portion of the car.

While there have been described above the principles of this invention in connection with specific apparatus, it is to be clearly understood that this description is made only by way of example and not as a limitation to the scope of the invention.

What is claimed is:

1. A vehicle screen, comprising:
   screen means for providing an air flow barrier within the interior of said vehicle, said screen means including a transparent portion and an opaque portion, said screen means being mounted within said vehicle such that said transparent portion provides no substantial impediment to a driver's visibility; said screen means having a first end which is attached to rear of the roof of said vehicle and a second end which may be alternatively placed near the floor of said vehicle providing a compartmentalizing function or near the window of said vehicle providing a sun blocking function;

means for mounting said screen means within said means for retracting said screen means about said mounting means, said screen means being movable from a first retracted position to a second elongated position;

said screen means providing a dual function of first compartmentalizing said vehicle such that only the driver's compartment would require air conditioning or heating, and second providing an opaque sun screen which is placed about the vehicle's windows to prevent sunlight from entering the vehicle, thereby cooling the vehicle and protecting the interior from the harmful effects of radiation.

2. The apparatus of claim 1 further comprising means for connecting said sun screen within said vehicle when said sun screen is in said second, elongated position, said sun screen mounting means being positioned near the roof of said vehicle, said sun screen being mounted transversely to the longitudinally axis of said vehicle thereby compartmentalizing the driver's compartment from the remainder of the vehicle, said connecting means allowing said sun screen to remain in said elongated position by connecting said sun screen to a portion of the vehicle's floor, said means for connecting also allowing said sun screen to be moved and connected near the window of the vehicle and therein act as a sun screen.

3. An apparatus as recited in claim 1, further comprising:

shaping means, said shaping means allowing the elongated edge of said screen means to conform to the shape of said automobile interior.

4. The apparatus of claim 1 wherein said screen means is a generally rectangular sheet of material, said rectangular sheet having a first transparent portion and a second opaque portion, said rectangular sheet being dimensioned to generally accommodate the interior dimensions of a vehicle from the roof of said vehicle to the floor of said vehicle, said transparent portion having dimensions which correspond to the general visibility area of a driver such that the driver's visibility through the rear window of said vehicle is generally unimpeded, said rectangular sheet being connected within said vehicle in said elongated position in a generally transverse manner to the longitudinal axis of said vehicle when said sheet is compartmentalizing said vehicle, said sheet being connected via it's elongated edge about the dashboard of said vehicle or alternatively about the rear dash of said vehicle when said sheet is acting as a sun screen, said rectangular sheet material being dimensioned such that said opaque portion provides an adequate sun screen.

5. The apparatus of claim 1 wherein said mounting means includes a rod, said rod being longintudinally adjustable allowing said screen means to conform to the dimensions of any vehicle, said rod being spring loaded to accomplish adjustability.

6. The apparatus of claim 1 wherein said means for retracting said screen means about said mounting means includes a spring loaded, rotational assembly.

* * * * *